Patented Apr. 3, 1923.

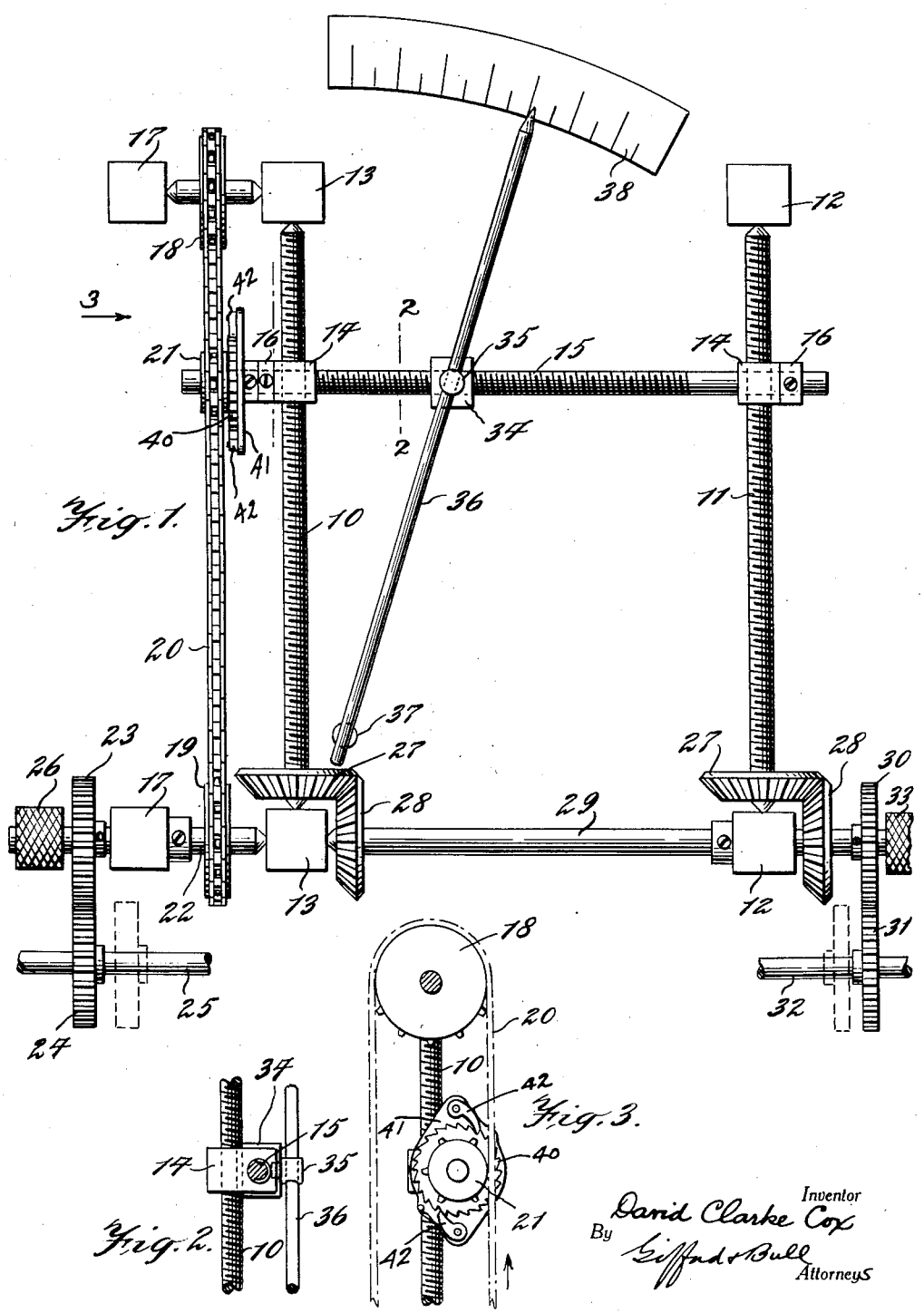

1,450,410

UNITED STATES PATENT OFFICE.

DAVID C. COX, OF PITTSFIELD, MASSACHUSETTS.

INDICATOR.

Application filed December 20, 1921. Serial No. 523,623.

*To all whom it may concern:*

Be it known that I, DAVID CLARKE COX, a citizen of the United States, residing at Pittsfield, in the county of Berkshire and State of Massachusetts, have invented certain new and useful Improvements in Indicators, of which the following is a specification.

My present invention is an instrument by which the results of two measuring mechanisms may be divided the one into the other so that an operator can at any time tell what the average of two measured quantities may be. For instance, if one of the measuring mechanisms is clock actuated and the other a distance-recording device, then my novel instrument will indicate at a glance the average speed which has been made up to the time the observation is taken. Similarly, if one of the measuring devices is connected to a machine operating more or less intermittently to produce pieces of work, then the indicator will show the average number of pieces produced per unit of time up to the time the observation is taken. As ordinarily applied, one of the measuring mechanisms will be a clock, although it will be understood that any other form of measuring device may be connected to the instrument instead of the clock.

In the annexed drawing, Fig. 1 is an illustrative form, more or less diagrammatic, of one embodiment of my invention; Fig. 2 is a section of a portion of Fig. 1 taken on the line 2—2; Fig. 3 is a view of Fig. 1, looking in the direction of the arrow 3.

Like reference characters refer to like parts in the several views.

In the drawing, a pair of parallel screws 10, 11 are mounted in bearings 12, 12 and 13, 13. Each screw is provided with a nut 14 through which extends a cross screw 15 held against longitudinal motion by collars 16, 16, the supports 14 being arranged to permit the cross screw 15 to be turned therein. Supported in the bearings 13 and 17 are the shafts of a pair of sprocket wheels 18, 19 carrying a chain 20. On the end of the cross screw 15 is a sprocket wheel 21, the teeth of which engage with one of the straight runs of the chain 20. The lower sprocket 19 is connected to the shaft 22 which is provided with a pinion 23 connecting with a driving pinion 24 on the shaft 25 which may be connected with any unit-measuring device, such as an odometer used on a motor vehicle. The driving pinion 24 may be moved along the shaft 25 to the dotted line position shown in Fig. 1, so as to free that pinion from the pinion 23. The shaft 22 is provided with a knurled knob 26 by which the shaft 22 may be turned when the pinions 23 and 24 are out of mesh.

At the bottom of each of the screws 10 and 11 is a bevel pinion 27, each connected to a bevel pinion 28 on a driving shaft 29, supported at one end in the bearing 13 and passing through the bearing 12. A pinion 30 is connected to the shaft 29 and meshes with a driving pinion 31 on a shaft 32 connected to a unit-measuring device, such as a clock. The pinion 31 may be moved out of mesh with the pinion 30, and a knurled knob 33 is provided to turn the shaft 29 when the pinions 30 and 31 are out of mesh.

On the cross screw 15 is a nut 34, in the face of which is a swivel 35 through which passes a rod or pointer 36 pivoted at 37, the upper end of the pointer passing over a scale 38.

Assuming that the device is arranged to indicate the average speed of a motor vehicle or the like, then the shaft 25 will be connected to the odometer and the shaft 32 to a clock mechanism. The pinions 24 and 31 will be thrown out of mesh and the knobs 26 and 33 turned to carry the cross screw 15 down to a position adjacent the pivot 37 and to turn the sprocket wheels 18 and 19 to bring the nut 34 to the right of Fig. 1 until it is above the pivot 37. At this time, the pointer 36 will be at right-angles to the axis of the cross screw 15 and its end will be opposite the zero of the scale. The pinions 24 and 31 are now thrown into mesh and the clock mechanism will turn the shaft 29 and the screws 10 and 11 to raise the nuts 14 and with them the cross screw 15 and its nut 34. Since the nut 34 at this time is directly above the pivot 37, such motion will have no effect on the pointer 36. If the vehicle is in motion, however, the shaft 25 will be turned in accordance with the number of miles traveled, and this motion will be transmitted through the chain 20 to the sprocket 21 and the cross screw 15. This will carry the nut 34 to the right of Fig. 1 in accordance with the number of miles traveled. Consequently, the position of the nut 34, which is an indicating device, will at any time indicate the average speed of the vehicle, and this is true no matter whether the vehicle has been stopped after it has traveled some distance or not. In other words, the position of the nut 34, measured both from its lowest position and from its extreme position at the left of Fig. 1, will indicate the resultant of the two motions given to it by the two measuring devices. This motion is, in turn, transmitted to the pointer 36, so that the average speed or the quotient of the number of units measured by the shaft 32 divided by the number of units measured by the shaft 35, can be read directly on the scale 38.

If, for instance, the position of the parts shown in Fig. 1 is that which they would occupy if the vehicle had traveled a total of sixty miles in three hours, then the pointer would stand at 20, or the average speed, on the scale. So long as this same average speed is maintained, the position of the pointer 36 will remain the same, because the ratio of the motion of the nut 34 to the right of Fig. 1 as compared with its vertical motion in Fig. 1, will be the same in each succeeding hour as it was in the previous time. If, on the other hand, the vehicle comes to a stop, the cross screw nevertheless continues to be moved upward, and this will swing the pointer 36 to the left of Fig. 1 to indicate the reduced average due to this stoppage. It will be understood, of course, that the scale 38 will be calibrated to provide for the difference in the distance moved by the end of the pointer because of the distance of the nut 34 from the pivot 37.

In the construction illustrated, unless provision were made therefor, a turning movement would be given screw 15 by raising it through the nuts 14. This is due to the contact between the chain 20 and the teeth of the sprocket 21. To eliminate this movement, which would falsify the results, I may provide a ratchet connection between the sprocket 21 and the screw 15. The sprocket is loose on the end of the screw 15 and has connected to it a ratchet 40 with which engage pawls 42 on a member 41 fastened to the screw 15. With this construction, if the chain 20 is stationary, as it would be in the case of a motor vehicle at rest, then the raising of the screw 15 by the clock mechanism would turn sprocket 21 clockwise and cause the sprocket 40 to slip under the pawls 42, so that screw 15 would not turn. When the motor vehicle started, however, chain 20 would be moved in the direction of the arrow in Fig. 3, and the screw 15 would be turned to move the nut 34.

It will be understood that the arrangement which I have shown is merely illustrative, and that the parts may be varied within wide limits. For instance, the use of the pointer 36 may be entirely dispensed with and the nut 34 be provided directly with a pencil or the like which will trace a curve to record the averages as well as to indicate them at any desired time.

It will also be understood that the mechanism for moving the recording device in two directions simultaneously may be varied within wide limits, though the arrangement which I have shown is a simple one which will operate with certainty.

I claim:—

1. In a device of the class described, a pair of parallel screws, a nut on each screw, a cross screw supported in the nuts on the parallel screws and held against longitudinal motion, a nut on said cross screw, mechanism to turn the parallel screws in unison in accordance with a first unit-measuring device and mechanism to turn the cross screw to move the nut thereon in accordance with a second unit-measuring device, whereby the position of the nut will indicate at any time the quotient of the number of units measured by the first measuring device divided by the number of units measured by the second measuring device.

2. In a device of the class described, a cross screw, a nut thereon, supports for said cross screw at either end thereof and arranged to permit it to turn and to prevent longitudinal motion thereof, clock-actuated mechanism to move said supports in unison continuously in a direction at right-angles to the axis of the cross screw and unit-measuring mechanism connected to the cross screw and arranged to turn it in accordance with the number of units measured.

3. In a device of the class described, a pivoted pointer, a cross screw, supports for said screw at either end thereof to permit it to rotate and to prevent longitudinal motion thereof, a sliding connection between the pointer and the nut, clock-actuated mechanism to move said supports in unison to move the cross screw bodily at right-angles to its axis, and mechanism actuated by a unit-measuring device to move the nut along the cross screw in accordance with the number of units measured, the pivot of said pointer being located so that the pointer is at right-angles to the axis of the cross screw when no units have been measured.

4. In a device of the class described, a cross screw, a nut thereon, supports for the cross screw at either end thereof arranged to permit it to turn and to prevent longitudinal motion thereof, means to move said supports in unison to move the screw bodily at right-angles to its axis, a sprocket on the cross screw, and a chain actuated by a unit-measuring device, the sprocket teeth engaging the chain to be moved thereby and to permit bodily motion of the sprocket along the chain.

5. In a device of the class described, a pair of parallel screws, a nut on each screw, a cross screw supported in the nuts on the parallel screws and held against longitudinal motion, a nut on said cross screw, mechanism to turn the parallel screws in unison in accordance with a first unit-measuring device, mechanism to turn the cross screw to move the nut thereon in accordance with a second unit-measuring device, whereby the position of the nut will indicate at any time the quotient of the number of units measured by the first measuring device divided by the number of units measured by the second measuring device, and a ratchet and pawl mechanism between the sprocket and the chain arranged to permit bodily movement of the screw along the chain without rotation of the screw and to rotate the screw when the chain moves.

DAVID C. COX.